(12) United States Patent
Gopalakrishnan et al.

(10) Patent No.: US 11,132,622 B2
(45) Date of Patent: Sep. 28, 2021

(54) AUTONOMOUS SYSTEM FOR HYPOTHESES GENERATION

(71) Applicant: INTERNATIONAL BUSINESS MACHINES CORPORATION, Armonk, NY (US)

(72) Inventors: Vishrawas Gopalakrishnan, Cambridge, MA (US); Kevin N. Tran, Boston, MA (US); Fang Lu, Billerica, MA (US); Gigi Y. C. Yuen-Reed, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 15/854,839

(22) Filed: Dec. 27, 2017

(65) Prior Publication Data

US 2019/0197431 A1 Jun. 27, 2019

(51) Int. Cl.
*G06N 20/00* (2019.01)
*G06F 16/904* (2019.01)

(52) U.S. Cl.
CPC ........... *G06N 20/00* (2019.01); *G06F 16/904* (2019.01)

(58) Field of Classification Search
CPC ............... G06F 17/3053; G06F 17/212; G06F 17/30554; G06F 17/248; G06F 8/33; G06F 8/36; G06F 17/3043; G06F 17/30864; G06F 16/367; G06F 16/24522; G06F 16/24573; G06F 17/16; G06F 15/18; G06F 16/242; G06F 16/248; G06F 16/24578; G06F 16/24575; H04N 21/8405; H04N 21/4828; H04N 21/42203; G10L 15/26; G06N 3/08; G06Q 10/1053; G06Q 50/01

See application file for complete search history.

(56) References Cited

U.S. PATENT DOCUMENTS

| | | | |
|---|---|---|---|
| 8,949,250 B1 * | 2/2015 | Garg | G06Q 50/01 707/748 |
| 10,048,945 B1 * | 8/2018 | Makkar | G06F 8/36 |
| 10,311,085 B2 * | 6/2019 | Rezaei | G06Q 30/0269 |
| 10,509,814 B2 * | 12/2019 | Lastra Diaz | G06F 16/24522 |
| 10,984,385 B2 * | 4/2021 | Xu | G06F 16/242 |

(Continued)

OTHER PUBLICATIONS

Chaussabel et al., "Mining microarray expression data by literature profiling," Published: Sep. 13, 2002 Genome Biology 2002, 3(10): research0055.1-0055.16, © 2002 Chaussabel and Sher, licensee BioMed Central Ltd., pp. 1-16.

(Continued)

*Primary Examiner* — Steven P Sax
(74) *Attorney, Agent, or Firm* — Teddi E. Maranzano (57) ABSTRACT

A bioinformatics system for autonomous hypothesis generation for relatedness of seemingly independent concepts having tenuous or no prior known relationship in a knowledgebase. Independent concept pairs are identified in a question, and they are evaluated in light of lists of their similar concepts, and in light input documents, word embeddings, and co-occurrence matrices that are organized as a time series. Relationships between the independent concepts are hypothesized based on temporal analysis of relatedness measures of their similar concepts, measured via candidate connecting concepts.

13 Claims, 4 Drawing Sheets

(56) References Cited

U.S. PATENT DOCUMENTS

| | | | | |
|---|---|---|---|---|
| 2011/0184896 | A1* | 7/2011 | Guyon | G06K 9/6269 706/12 |
| 2014/0075004 | A1* | 3/2014 | Van Dusen | G06F 16/90335 709/223 |
| 2015/0293972 | A1* | 10/2015 | Lu | G06F 16/2455 707/769 |
| 2016/0034463 | A1* | 2/2016 | Brewer | H04L 43/12 707/734 |
| 2016/0042069 | A1* | 2/2016 | Lee-Goldman | G06F 40/295 707/706 |
| 2016/0179945 | A1* | 6/2016 | Lastra Diaz | G06F 16/3334 707/739 |
| 2016/0189218 | A1* | 6/2016 | Kota | G06F 16/951 705/14.54 |
| 2017/0286835 | A1* | 10/2017 | Ho | G06F 16/367 |
| 2017/0364520 | A1* | 12/2017 | Venkataraman | G06F 16/3329 |
| 2017/0372162 | A1* | 12/2017 | Wang | G06K 9/00664 |
| 2018/0150739 | A1* | 5/2018 | Wu | G06N 3/006 |
| 2018/0232443 | A1* | 8/2018 | Delgo | G06F 16/35 |
| 2019/0073420 | A1* | 3/2019 | Agapiev | G06F 16/9024 |
| 2019/0171944 | A1* | 6/2019 | Lu | G06N 5/022 |
| 2019/0171947 | A1* | 6/2019 | Mohan | G06N 5/022 |

OTHER PUBLICATIONS

Gopalakrishnan et al., "Generating Hypothesis: Using Global and Local Features in Graph to Discover New Knowledge from Medical Literature," BICOB 2016, Apr. 4-6, 2016, Las Vegas, Nevada, USA 978-1-943436-03-3 / Copyright ISCA, pp. 1-8.
Gordon et al., "Literature-Based Discovery on the World Wide Web," ACM Transactions on Internet Technology, vol. 2, No. 4, Nov. 2002, pp. 261-275.
Gordon et al., "Toward Discovery Support Systems: A Replication, Re-Examination, and Extension of Swanson's Work on Literature-Based Discovery of a Connection between Raynaud's and Fish Oil," Journal of the American Society for Information Science, 47(2):116-128, 1996 (Best Date Available), Copyright 1996 John Wiley & Sons, Inc., pp. 116-128.
Hristovski et al., "Exploiting Semantic Relations for Literature-Based Discovery," AMIA 2006 Symposium Proceedings, Nov. 11-15, 2006, Washington, D.C., pp. 349-353.
Hristovski et al., "Using literature-based discovery to identify disease candidate genes," International Journal of Medical Informatics (2005) 74, pp. 289-298, received in revised form Apr. 6, 2004; accepted Apr. 20, 2004.
Hu et al., "A Semantic Approach for Mining Hidden Links from Complementary and Non-interactive Biomedical Literature," Proceedings of the Sixth SIAM International Conference on Data Mining: Preface, Apr. 20-22, 2006, Bethesda, Maryland, pp. 200-209.
Hu et al., "Mining Hidden Connections Among Biomedical Concepts from Disjoint Biomedical Literature Sets Through Semantic-Based Association Rule," International Journal of Intelligent Systems, vol. 25, 20x 223 (2010), 2009 Wiley Periodicals, Inc., Published online in Wiley InterScience (www.interscience.wiley.com). • DOI 10.1002/int.20396, pp. 207-223.
Liu et al., "Exploring the Effects of External Semantic Data on Word Embeddings," https://web.stanford.edu/class/cs224n/reports/2760325.pdf, In bibtex:@article{liuexploring, title={Exploring the Effects of External Semantic Data on Nord Embeddings}, author={Liu, Zihua and Hang, William and Zhang, Brian}, Nov. 2017, pp. 1-7.
Petric et al., "Literature mining method RaJoLink for uncovering relations between biomedical concepts," Journal of Biomedical Informatics, 42 (2009) 219-227, Available online Aug. 19, 2008, pp. 219-227.
Pratt et al., "LitLinker: Capturing Connections across the Biomedical Literature," K-CAP'03, Oct. 23-25, 2003, Sanibel Island, FL, USA. Copyright 2003 ACM, pp. 1-8.
Sehgal et al., "Manjal—A Text Mining System for Medline," SIGIR'05, Aug. 15-19, 2005, Salvador, Brazil. ACM 1-59593-034-5/05/0008, pp. 1-1.
Shatkay et al., "Genes, Themes and Microarrays; Using Information Retrieval for Large-Scale Gene Analysis," From: ISMB-00 Proceedings, 2000 (Best Date Available), Copyright © 2000, AAAI (www.aaai.org), pp. 317-328.
Smalheiser et al., "Using ARROWSMITH: a computer-assisted approach to formulating and assessing scientific hypotheses," Computer Methods and Programs in Biomedicine 57 (1998), pp. 149-153, accepted Feb. 24, 1998.
Srinivasan et al., "Text Mining: Generating Hypotheses From MEDLINE," Journal of the American Society for Information Science and Technology, 55(5), pp. 396-413, 2004, revised Sep. 24, 2003; accepted Sep. 24, 2003 © 2003 Wiley Periodicals, Inc.
Swanson et al., "An interactive system for finding complementary literatures: a stimulus to scientific discovery," Artificial Intelligence 91 (1997), pp. 183-203.
Swanson et al., "Information Discovery from Complementary Literatures: Categorizing Viruses as Potential Weapons," Journal of the American Society for Information Science and Technology,52(10), pp. 797-812, Copyright 2001 John Wiley & Sons, Inc.
Weeber et al., "Generating Hypotheses by Discovering Implicit Associations in the Literature: A Case Report of a Search for New Potential Therapeutic Uses for Thalidomide," Journal Am Med Inform Assoc., May / Jun. 2003;10:252-259. DOI 10.1197/jamia.M1158, pp. 252-259.
Weeber et al., "Using Concepts in Literature-Based Discovery: Simulating Swanson's Raynaud—Fish Oil and Migraine—Magnesium Discoveries," Journal of the American Society for Information Science and Technology,52(7):548-557, Accepted Dec. 15, 2000; Revised Dec. 15, 2000, pp. 548-557.
Wren, "Extending the mutual information measure to rank inferred literature relationships," BMC Bioinformatics 2004, Published: Oct. 7, 2004, 5:145 doi:10.1186/1471-2105-5-145, pp. 1-13.
Xun et al., "Generating Medical Hypotheses Based on Evolutionary Medical Concepts," ICDM 2017, to be held Nov. 18-21, 2017, In bibtex: @inproceedings{xun2017generating, author= {Guangxu Xun and Kishlay Jha and Vishrawas Gopalakrishnan and Yaliang Li and Aidong Zhang}, title = {Generating Medical Hypotheses Based on Evolutionary Medical Concepts (To appear)}, booktitle = {{IEEE} 17th International Conference on Data Mining, {ICDM} 2017, Pageds 1-10.
Yogatama et al., "Learning Word Representations with Hierarchical Sparse Coding," Proceedings of the 32nd International Conference on Machine Learning, Lille, France, 2015 (Best Date Available). JMLR: W&CP vol. 37, Copy-right 2015 by the author(s), pp. 1-10.
Huang et al., "A New Method for Mining Biomedical Knowledge Using Biomedical Ontology," Abstract, Wuhan University Journal of Natural Sciences, Apr. 2009, 14:134, First Online: Mar. 8, 2009, pp. 1-4.

\* cited by examiner

AUTONOMOUS SYSTEM FOR HYPOTHESES GENERATION

BACKGROUND

Embodiments of the invention generally relate to computing systems, and more particularly to application of machine learning techniques to natural language processing in bioinformatics systems.

Rapid increases in human knowledge across a variety of domains, such as medicine, have in turn led to an increase in the amount of unstructured data; data generated by humans for consumption by humans. As traditional computers process unstructured data by merely storing and communicating the data, they cannot understand unstructured data or derive insights from them.

A common form of unstructured data is natural language text found in natural language documents. In the medical domain, these documents can take many forms, including, for example, clinical notes by doctors, and medical literature (for example, scholarly articles, text books, and the like).

The process of providing medical insights based on medical data (including structured and unstructured data) belongs to the field of bioinformatics. In this context, a bioinformatics system is a computing system that provides bioinformatics functions. One type of insight that a bioinformatics system provides is whether two given medical concepts having little or unknown associations are in fact related; or, given a single medical concept, what other concepts might be related to it, other than concepts to which it has a known relationship.

A concept may be a word or phrase representable as a node in a knowledge graph of a knowledge domain. The node may be a parent node or a child node; a root node or a leaf node. For instance, a knowledge domain may be "human anatomy", and each biological system and each organ may be concepts of the human anatomy knowledge domain. Their relationships may be representable as a knowledge graph; this graph may itself be a constituent of another knowledge graph having a more generalized scope. For example, the "human anatomy" knowledge graph may be classified as a sub-graph of a more general "anatomy" knowledge graph.

Two concepts related, or their relatedness "exists" or is "known" if the two concepts have an existing connection or association in a knowledgebase. For example, if there are n edges in a knowledge graph connecting those concepts, they may be said to have a known relationship (n can be a configurable threshold value). In another variation, two concepts might be said to have a known relationship if they co-occur in the same context. In yet another variation, two concepts might be manually tagged (for example, by a subject matter expert) as related.

SUMMARY

Embodiments of the invention provide for methods, computer program products, and systems for evaluating relatedness of a pair of independent concepts by a bioinformatics system. The bioinformatics system receives a query input including a pair of independent concepts, including a first independent concept and a second independent concept, the first and second independent concepts having no formally recognized relationship in a knowledgebase of a domain of knowledge.

The bioinformatics system generates a set of lists of similar concepts for the pair of independent concepts. The set of lists include a first list of concepts deemed similar to the first independent concept, and further includes a second list of concepts deemed similar to the second independent concept.

The bioinformatics system identifies a set of candidate connecting concepts for at least one pair of similar concepts. A first concept in the at least one pair of similar concepts is selected from the first list of concepts and a second concept in the at least one pair of similar concepts is selected from the second list of concepts. The set of candidate connecting concepts co-occur, in set of input documents, with the first and second concepts in the at least one pair of similar concepts. The bioinformatics system then uses the pair of similar concepts, the set of candidates connecting them, and the temporal evolution of the association between them, to generate predictive models The bioinformatics system generates a hypothesis for the pair of independent concepts based on the identified candidate connecting concepts and the predictive models. The hypothesis represents a proposition that the first and second independent concepts are related, and the candidate connecting term and the input documents in which it co-occurs with the similar concepts is an evidence for that hypothesis.

DETAILED DESCRIPTION

A great challenge in the electronic computing arts in general, and bioinformatics systems in particular, is to derive latent insights from electronically stored natural language text. Embodiments of the disclosed invention provide unique solutions to this challenge in the electronic computing arts. That is, the solutions that embodiments of the invention provide are uniquely tailored to how computing systems handle natural language data; the solutions are not broad methods of deriving insights from existing knowledge, but rather provide solutions to how computers themselves work with this data. As will be appreciated by even a person of ordinary skill in the art, the solutions are anything but routine or conventional, and they cannot be described as merely automating functions that a human can perform. In fact, the solutions are significant. With the disclosed invention, a computer can derive insights from unstructured data that a computer cannot derive without the aid of the disclosed invention.

Recall that one function that a bioinformatics system, and methods for its use, may provide in the area of unstructured data processing is to provide insights related to two or more given concepts; or, given one concept, insights as to one or more related concepts. In either case, the insight is to indicate relatedness of those concepts where the relation did not previously exist in a reference knowledgebase. The insight is backed up by evidence (i.e., the bioinformatics system provides the reasons for deeming the given concepts as being related notwithstanding the lack of their relatedness in the reference knowledgebase).

Consider, for example, a medical professional who may wish to know if a particular illness is related to another illness, or to a particular substance; "is there a relationship between fish oils and Raynaud's disease, and what is the evidence for the relationship?" Or, having a given concept in mind, the medical professional may wish to know if another illness or a substance (neither of which are given) are related to the given concept; "what are different treatments for Raynaud's disease?". In the first example query sentence, the particular illness (Raynaud's disease) and the particular substance (fish oil) are concepts; the concepts are expressly given in the query sentence. In the second example query sentence, the particular illness (Raynaud's disease) is a concept; but the query sentence does not explicitly recite a given second concept.

One approach to providing insights in the field of bioinformatics is hypothesis generation. In the context of the above example, one hypothesis might be that fish oils and Raynaud's diseases are related. A more specific hypothesis might be that "consuming fish oils is a possible treatment for Raynaud's disease"; i.e., they are related in that consuming one is a treatment for the other. This information might not exist in a reference knowledgebase, in which case the two may be assumed to have no known direct relationship, or no formally recognized relationship. Hypothesis generation functions of a bioinformatics system can be very useful, therefore, in generating evidence-based hypotheses that may provide insights to users.

Accordingly, hypothesis generation in bioinformatics systems often has the intent to generate high confidence, non-trivial, and previously unknown postulates, using computing techniques including those not replicable by a human user. Aspects of the disclosed invention provide for autonomous hypothesis generation through unconventional, and significantly novel, computer-implemented processes that cannot be replicated by human mental processes. Some embodiments of the disclosed invention provide for a self-reliant bioinformatics system, and methods of its use, that provide one or more of the following functions: autonomous training data set generation for classifying concept relationships; predicting when relationships between two concepts are likely to occur; and generating unique data structures that enable one or both of the first two functions.

Although some embodiments of the disclosed invention are described in connection with the medical domain, even an ordinary person of skill in the art will appreciate that the claimed invention is applicable to other knowledge domains.

Autonomous hypothesis generation is a significant contribution to the art of bioinformatics. For example, hidden connections between two concepts under consideration may entail alternative use of a drug. Previously unknown interaction between drugs and the resultant adverse events, and in general some unknown connections between medical concepts, and timely discovery backed by medically interpretable evidence would enable medical researchers and clinical practitioners to improve their products, provide better clinical care, and efficiently improve research efforts.

There are some existing approaches to the task of hypothesis generation in the art of bioinformatics; but they are limited and flawed in many respects. For example, current approaches are constrained towards targeted discovery, i.e., the user must provide a query in terms of medical concepts for which there is no direct relationship currently existing in the knowledge-base. In response to the query, the system provides a ranked list of evidence that connect the concepts in the query, and yield a hypothesis that is novel (not known in the knowledge-base) as well as biologically sensible (i.e., a hypothesis that does not go against known concept relationships).

At the same time, the overwhelming amount of research articles in the domain of bio-medicine (i.e., unstructured data) in conjunction with the large body of real world evidence arising from doctor-patient interactions in the doctors' notes or insurance claims systems make the task of discovering important connections nearly impossible, or at least very challenging and manual-labor intensive. The process cannot be automated using conventional computing techniques that merely perform human tasks faster and with fewer mistakes. The process provided by embodiments of the invention is entirely technology-based.

Staying for now with drawbacks of current approaches; generically speaking, the relevant works in this area of bioinformatics belong to Literature Based Discovery, with many specific tasks demonstrated as use-cases. The intended task of algorithm and techniques in this area range from identifying hidden relationships between drugs and diseases (for instance, finding functional connections between genes or identifying target diseases for thalidomide drug), to identifying viruses that may be used as bio-weapon; and that "genetic algorithms" have relationships with "computer graphics" and "fluid dynamics." Existing approaches in Literature Based Discovery in the field of bioinformatics can be categorized into manual approaches, distribution-based approaches, and relation-based approaches.

Systems that implement the manual approach rely heavily on human intervention to guide the discovery process. The interventions are usually in the form of manual perusal of the evidences, providing additional constraints to make the discovery more focused, and in a very primitive form, even indicating the relevant portions in the literature that the system should ingest for its analysis. Generating longer chains of evidence connecting the query terms is unfeasible.

Systems that implement the distribution-based approach use frequency statistics as the backbone of their analysis. A drawback of these systems is the conflicting interpretations that occur due to integration of different frequency based approaches; often resulting in manual support and providing high-level semantic pruning. Such systems also do not learn the association formation process between medical concepts, leading to opaque insights that are hard to interpret and justify.

Systems that implement the relation-based approach use human labelled annotations and predicates between medical concepts (e.g., X Treats Y) to generate and infer new relationships. Such inferences are usually derivative in nature and, even if learnt, are based on training samples labelled by human annotators. The drawback of human-guided learning is that the system then mimics the knowledge of human annotators and is incapable of furthering its capability to discover new and novel knowledge. Moreover, if the human annotators have limited knowledge or are biased, so are the inferences that the system makes.

Now consider aspects of the disclosed invention, which provide for a bioinformatics system(s), and methods of its use, including an autonomous hypothesis generator that automatically generates a training data set by observing and understanding an association formation process from previously established associations; thus, capturing the implicit associations between the concepts. This new process of "self-learning" is enhanced through natively incorporating temporal analysis to not only understand the association formation process, but also to predict the time-frame of the discovery, and give an association formation trajectory.

Embodiments of the invention reduce the need for human-provided training data sets and remove the resulting human bias that influences the discovery process. Embodiments of the invention also set the ground for bootstrapping the discovery process to continuously, autonomously, and independently generate various confidences associated with "hypotheses worlds" (each drawn from a previous conclusion), which are reinforced or softened through an intersection of the conclusions (i.e., the prediction and its corresponding time-frame) of these worlds.

Stated another way, various embodiments of the invention provide for simultaneous learning of valid hypotheses model and ranking criteria; the ability to learn what are good connecting terms for hypotheses; learning when the hypothesis will materialize, and learning what terms are likely to come from the future hypotheses; bootstrapping of the hypotheses generation process based on results of the previous iteration, and reinforcing a hypothesis tree; automatically generating the training data set for extracting patterns and creating different necessary models; and providing the option to include human curated knowledge without adding a bias to the discovery process.

Figure 1:
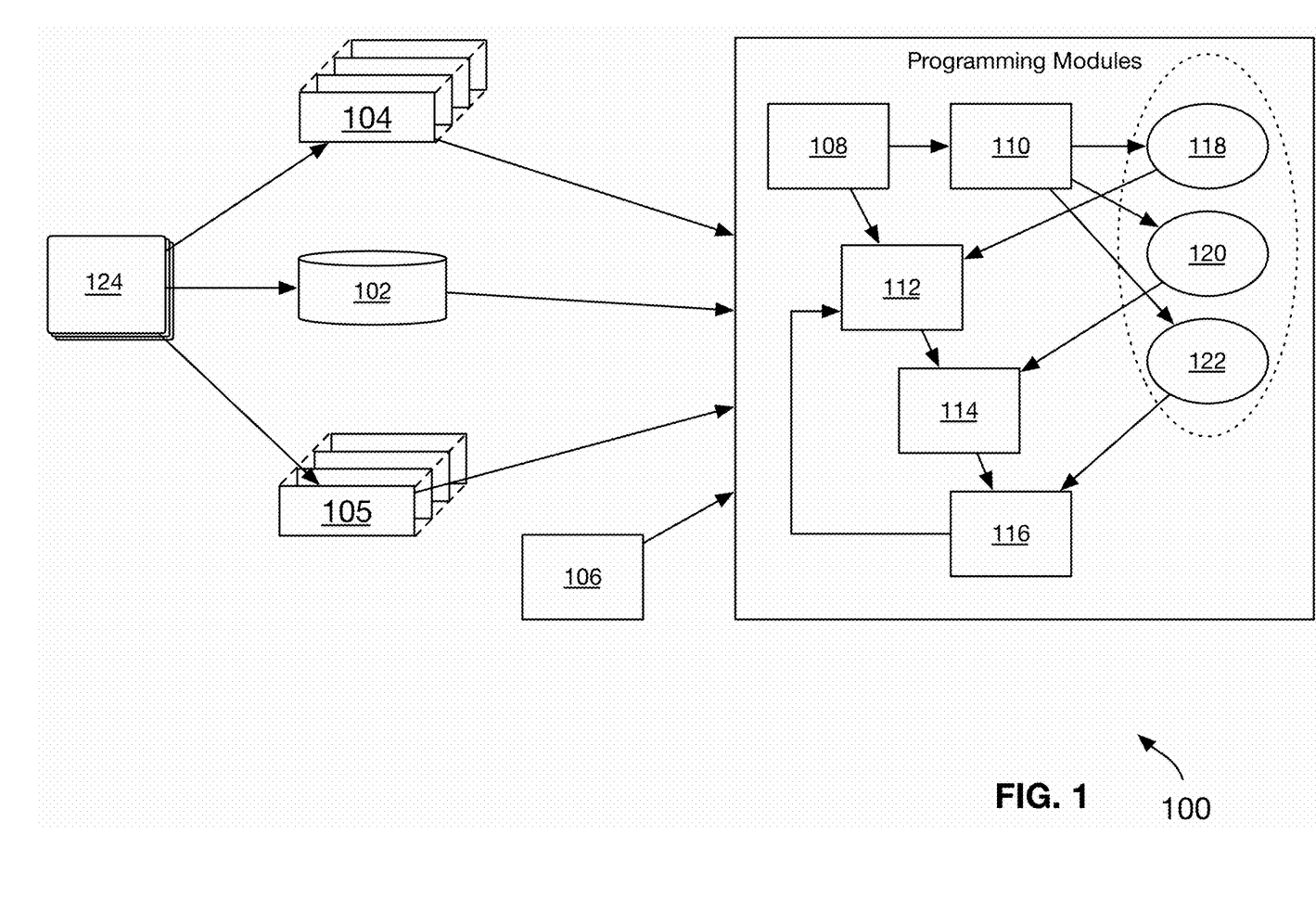
FIG. 1 is a block diagram of a bioinformatics system 100, according to an embodiment of the invention.
Figure 2:
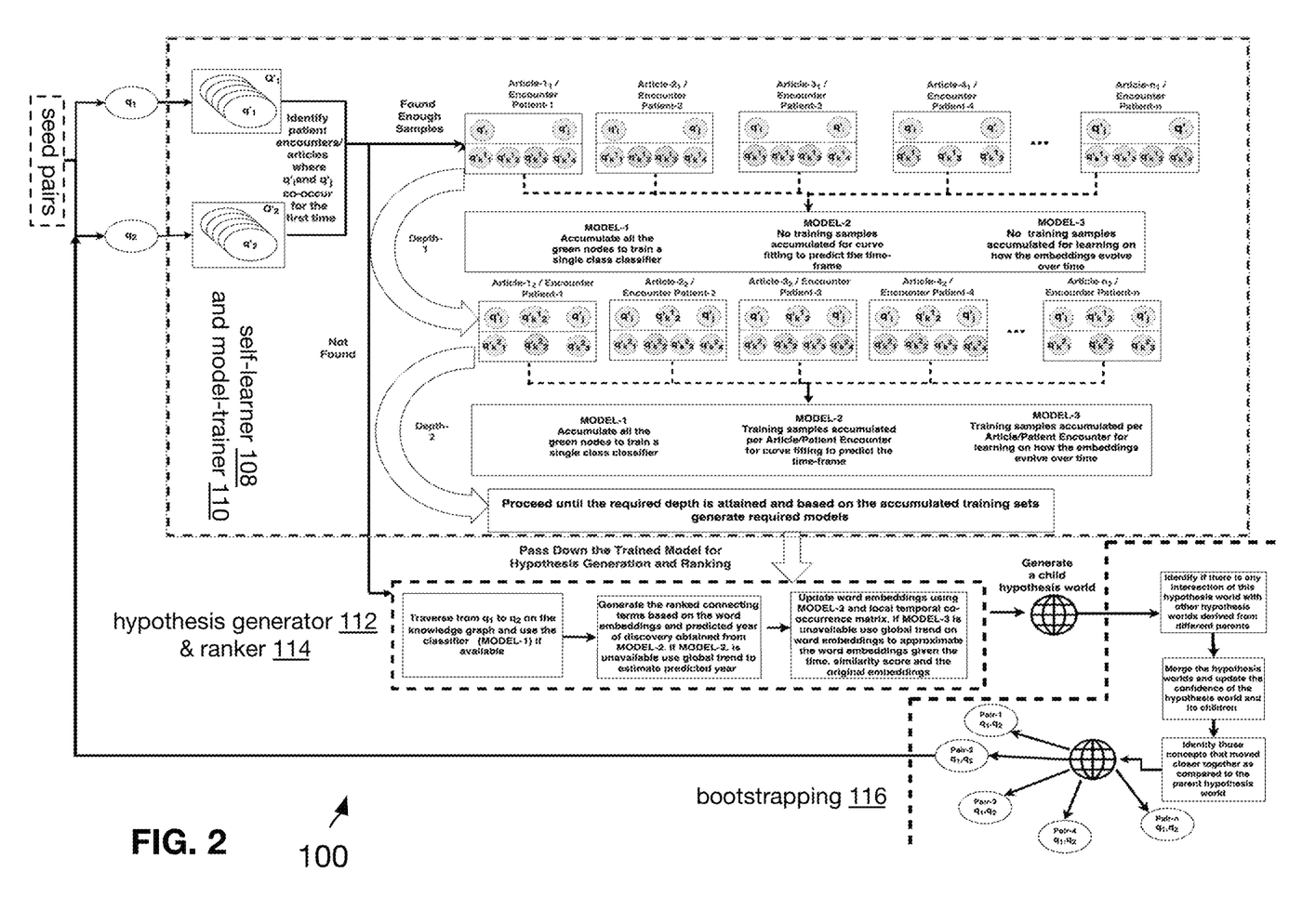
FIG. 2 is a block diagram of additional details of certain aspects of bioinformatics system 100 of FIG. 1, according to an embodiment of the invention.

These and other aspects of embodiments of the disclosed invention will be described in greater detail in connection with the various Figures. Before discussing the Figures in turn, here is a short summary of the organization of the Figures. First, a high-level description of an illustrative bioinformatics system and its system architecture are discussed in connection with FIG. 1. This includes, for example, the general computing environment, some of the data sources that may be used, and a general overview of how data moves about the bioinformatics system. More details of select components of the bioinformatics system are discussed in connection with FIG. 2. These include, for example, details on some of the modules of the bioinformatics system of FIG. 1 and the movement of data through them. Some of the methods for using the bioinformatics system of FIGS. 1 and 2 are discussed in connection with a method, illustrated via a flowchart in FIG. 3. Finally, FIG. 4* provides an illustrative computing device that may implement some aspects of the invention.

Referring now to FIG. 1, a bioinformatics system 100 is provided, according to an embodiment of the invention. Bioinformatics system 100 generally includes the following components: a reference knowledgebase 102, a time series of word embeddings 104, a time series of co-occurrence matrices 105, query input data 106, input documents 124, and a set of programming modules. The set of programming modules generally include programming instructions that are executable by one or more processors of bioinformatics system 100. Execution of the programming instructions by the one or more processors causes bioinformatics system 100 to perform one or more functions or methods. The programming modules include, for example, a self-learner 108 module, a model trainer 110 module, a hypothesis generator 112 module, a hypothesis ranker 114 module, and a bootstrapping 116 module. Each of these entities, elements, components, or modules are described in more detail below.

With continued reference to FIG. 1 and its constituent elements, bioinformatics system 100 may be a computing system having the general structure and components of a computing device as described in connection with FIG. 4*. In general, bioinformatics system 100 may be a computing device that receives query input data 106, processes that data, and generates output data. The output data generally may include evidence-based hypotheses about new relationships between independent concepts, i.e., concepts that do not have a known relationship in a knowledgebase.

Bioinformatics system 100, according to various embodiments of the invention, also provides for simultaneous learning of valid hypotheses models and ranking criteria; the ability to learn what are good connecting terms for hypotheses; learning when a given hypothesis will materialize, and learning what terms or concepts are likely to come from the future hypotheses; bootstrapping of the hypothesis generation process based on results of previous analysis iterations, and reinforcing a hypothesis tree; automatically generating training data sets for extracting patterns, and creating different necessary models; and providing the option to include human curated knowledge without adding human bias to the discovery process.

With continued reference to FIG. 1 and constituent elements of bioinformatics system 100, knowledgebase 102 (at times called "reference knowledgebase" throughout this discussion to emphasize that the system can work with multiple knowledgebases) is data that is organized or tagged in such a way as to identify relationships between its constituent elements. A knowledgebase may be represented or embodied, for example, as a knowledge graph of a knowledge domain. In bioinformatics system 100, for example, knowledgebase 102 may be a knowledge graph of medical concepts that identifies known relationships between those concepts (for example, a tree graph, a directed graph, a bipartite graph, etc.). Given reference knowledgebase 102 and its concepts, some concepts may have one or more direct known relationships, some concepts may have no relationships, and some concepts may be related via intervening concepts. As previously stated, one aim of hypothesis generation functions of bioinformatics system 100 may be to provide hypotheses as to relationships between concepts in knowledgebase 102 that have tenuous or non-existent relationships in knowledgebase 102, but that are nevertheless hypothesized or postulated to be related, based on some evidence discovered by bioinformatics system 100.

In an embodiment, knowledgebase 102 may be, or at least include, a bipartite graph G having a set (U) of medical concepts having known interactions (for example, drugs, diseases, symptoms, etc.), and a set (V) of documents (such as scholarly articles, patient records, or other natural language documents). Each pairing Pair-n of related concepts $q_1$ and $q_2$ in U is a vertex in U, and each document in V is a vertex in V. In the context of the bipartite graph G, a given concept pair vertex in set U is connected to a given document vertex in set V if the document indicates the relationship expressed in the concept pair (for example, if the concepts in the concept pair co-occur in that document). For example, $U_1$ may be connected to $V_5$ if the document represented by $V_5$ indicates the relationship of the concept pair represented by $U_1$. The bipartite knowledge graph G of knowledgebase 102 can be generated using, for example, a concept-detection tool.

In an embodiment, the documents in V have an associated timestamp (date, time, or another temporal identifier); they may be said to be in a time series. In the case of a patient record, for example doctors' notes, the associated timestamp may be the date on which the record was created, the date on which the patient record is based (for example, the date of the patient's visit), or another date. In the case of a natural language document, for example an electronic scholarly article, the associated timestamp may be the date of the article's publication, the date on which the experiments or trials described in the article were conducted, or another date. Document dates can be identified manually, or automatically, according to any known method in the art.

With continued reference to FIG. 1 and constituent elements of bioinformatics system 100, query input 106 is a set of input data including one or more queries and/or associated metadata and query constraints. In one embodiment, query input 106 includes multiple questions (query texts) that recite independent pairs of concepts; for example, independent pairs of medical concepts $I(q_1, q_2,)$. Referring back to the example of Raynaud's disease for a moment to illustrate the point, assume that in knowledgebase 102, there are no known direct relationships between the concept "Raynaud's disease" and the concept "fish oils". Each of them is an independent concept relative to the other, in the context of the query input 106. In this example, then, one of the questions in query input 106 might include the pairing of Raynaud's disease and fish oils; for example, "is Raynaud's disease related to fish oils?" The query constraints may include, but are not limited to, additional parameters like a maximum depth to traverse in knowledge graph 102, a cut-off date that would indicate the latest year of publication dates in the case of medical articles, or encounter dates in the case of patient records, etc.

In an embodiment, questions in query input 106 may be manually or automatically generated so as to include sufficiently distant concepts; i.e., concepts that have no known or little-known relationships (the distance may be determined using a thresholding algorithm). This feature allows the bioinformatics system 100 to get instantiated by multiple varied question and prevents any bias or resulting skewness.

With continued reference to FIG. 1 and constituent elements of bioinformatics system 100, word-embeddings 104 (also referred to as "time series word embeddings 104") are a set of word-embeddings of concepts in domain knowledge 102, generated based on input documents 124, and organized in a time series. A word embedding of a word is a k-dimensional vector for that word (i.e., a vector-based representation of text of size k). The k-dimensional vector of a concept captures the semantic similarities and relationships with respect to other various concepts in the set of input documents 124. As the documents and patient records themselves are arranged in a time-series fashion, where a concept can occur in multiple documents spanning multiple time slices, say t, the set of word embeddings 104 will have a dimension of n×k×t, where n indicates the total number of concepts in knowledgebase 102, k corresponds to the size of the word vector per concept, and t refers to the total number of time slices.

Time slices may be organized based on timestamps of the various input documents 124. In one embodiment, time slices may correspond to the years, months, or other time interval of the timestamps of input documents 124. A different organization may be used depending on the nature or category of the documents in input documents 124. For example, for doctors' notes, the time slices may correspond to different patient visits; for scholarly articles, they may correspond to publication year. In other embodiments, the time slices may be uniformly defined (for example, by year) regardless of the nature or category of input documents 124.

With continued reference to FIG. 1 and constituent elements of bioinformatics system 100, a time series of co-occurrence matrices 105, also called temporal co-occurrence matrices 105, is a set of word matrices generated for each of input documents 124. As input documents 124 are organized temporally, so are the resultant word matrices. A co-occurrence word matrix, in its simplest form, may be a two-dimensional matrix having columns and rows; the columns have column identifier elements (for example, words), and the rows have row identifier elements (for example, words). The row identifier elements are word values of the elements of the first row, and the column identifiers are word values of the elements of the first column. A given matrix element that is neither in the first row nor in the first column (but represents an intersection of a given row identifier and a given column identifier) may be a number value indicating whether the word in that row co-occurs with the word in that column; for example, in a binary format, (1) represents co-occurrence, and (0) represents lack of co-occurrence. Other co-occurrence matrix formats are possible (for instance, in a digital format, the number value may indicate how many times intersecting words co-occur, and not just whether they co-occur; for example, a (5) would indicate that the corresponding words co-occur five times). Since the system is instantiated through multiple queries, with each query itself being processed independently, multiple versions of co-occurrence matrix, which are local to individual thread evaluating the query exists.

With continued reference to FIG. 1 and constituent elements of bioinformatics system 100, input documents 124 are documents represented by vertices V in the bipartite graph G of knowledgebase 102. Input documents 124 may be classified or organized in a number of ways; in an embodiment, they are serialized temporally regardless of their classification. For example, input documents 124 may be a set of patient records and scholarly articles. Regardless of which type of document they include, the documents may be organized (or at least, it may be suitable for organization) by timestamps. In the case of patient records, for example, each document may correspond to a different doctor/hospital visit. In the case of scholarly articles, for example, each document may correspond to a different publication having a different timestamp (i.e., published at different times). Input documents 124 may be grouped as well. For example, doctors' notes may (but need not) be grouped by patient, and articles may (but need not) be grouped by publication source. The term "time slices" in this context corresponds to the term "time slices" as defined in connection with word embeddings 104, discussed above.

With continued reference to FIG. 1 and constituent elements of bioinformatics system 100, and turning now to the various programming modules; self-learner 108 module generally receives as input, data in knowledgebase 102 (recall that this includes concept, and concept pairs known to be related based on bipartite knowledge graph G), word embeddings 104, and temporal co-occurrence matrices 105. Self-learner 108 module processes this input (described in more detail in connection with FIGS. 2 and 3), and provides its output to model trainer 110 module.

Generally, self-learner 110 module's processing functions may be as follows. Self-learner 108 module uses word embeddings 104 and temporal co-occurrence matrices 105 to identify a list of concepts that are "similar" to the independent concepts in query input 106. The pair of independent concepts may be called a seed pair, and denoted as $I(q_1, q_2)$ (the "I" denotes "independent"). For each independent concept in this pair, self-learner 108 module creates lists of concepts $Q'_n$ that are similar to each of them (i.e., a list of concepts $Q'_1$ related to $q_1$, and a list of concepts $Q'_2$ related to $q_2$). Self-learner 108 module may then select, for further processing or consideration, pairs of similar concepts, one from each list. In other words, self-learner 108 module selects similar concept pairs ($q'_i$, $q'_j$), where $q'_i$ is a similar concept selected from $Q'_1$, and where $q'_j$ is a similar concept selected from $Q'_2$.

In an embodiment, if the first list, $Q'_1$, contains n similar concepts, and if the second list, $Q'_2$, contains m similar concepts, and assuming n>m, self-learner 108 module may consider m pairs of similar concepts. In another embodiment, self-learner 108 module may consider as many as n×m similar concept pairs. Different pairings are possible, and different pairing choices may be made during iterative execution of self-learner 108 module's functions.

In an embodiment, whether a given concept is sufficiently similar to a given independent concept may be determined based on a distance measure of that concept to the independent concept as reflect in knowledgebase 102 and in word embeddings 104. Other distance measures are also possible. A predetermined or dynamically set threshold value may be used to determine whether the given concept is sufficiently similar to the independent concept.

Referring back to the example of Raynaud's disease for a moment to illustrate the point; self-learner 108 module identifies "Raynaud's disease" and "fish oils" as concepts to process (so far as self-learner 108 module is aware by virtue of knowledgebase 102, these concepts are independent). For each of these independent concepts in I($q_1$, $q_2$,), self-learner 108 module creates a list of concepts $Q'_n$ that are similar to each of them (i.e., a list of concepts $Q'_1$ related to "Raynaud's disease", and a list of concepts $Q'_2$ related to "fish oils"). Similarity, in this context, is a value that may be measured using any distance or similarity process based on data in word embeddings. For example, for the concept of "Raynaud's disease", self-learner 108 module may compare the word vector of "Raynaud's disease" to word vectors of other concepts with which "Raynaud's disease" co-occurs (as reflected in temporal co-occurrence matrices 105). For any such other concept whose word vector is deemed "similar" to the word vector for "Raynaud's disease", that word may be added to the list of similar concepts for the independent. In one example, the list $Q'_1$ for Raynaud's disease may be populated with concepts like "blood flow" and "cold temperature", and the list $Q'_2$ for "fish oils" may be populated with concepts like "lipids" and "omega-3". In this example, similar concepts in each list may be identified as similar to their respective independent concepts because the similar concepts and the independent concept co-occur in one or more input documents 124.

With continued reference to FIG. 1 and constituent elements of bioinformatics system 100, and in particular the functions of self-leaner 108 module; for each pair of an independent concept I($q_1$, $q_2$,), self-learner 108 module determines how related their similar concepts ($q'_i$, $q'_j$) are. The similar concept $q'_i$ is an entry selected from the list $Q'_1$, and the similar concept $q'_j$ is selected from the list $Q'_2$. If the first list is of size n and the second list is of size m, self-learner 108 module may analyze as many as n×m pairs of similar concepts for each pair of independent concepts I($q_1$, $q_2$,). For example, concepts that are similar to "Raynaud's disease" are analyzed relative to concepts that are similar to "fish oils".

Self-learner 108 module traces the evolution of two independent concepts' relatedness in input documents 124 by determining, for each pair of similar concepts ($q'_i$, $q'_j$) of the pair of independent concepts, one or more concepts that co-occur with the similar concepts in the same input document 124. The length or depth at which the association is traced may be a predetermined value, or it may be a configurable value provided as a constraint. This process generally includes using temporal co-occurrence information (in temporal co-occurrence matrices 105), word embeddings 104, and time series analysis, to characterize the factors (the co-occurring medical concepts) that bring the identified concept pair closer together.

Each concept that co-occurs with both of the similar concepts ($q'_i$, $q'_j$) in a single input document is called a connecting word or connecting concept, and may be denoted as ($q'^a_{k\,n}$), where the notation $q'_k$ denotes a connecting concept, the notation a represents the depth level of the connecting concept, and the notation n denotes the number of connecting concepts. In one example, the set of connecting concepts for similar concepts ($q'_i$, $q'_j$), found in a particular input document 124, may include connecting concepts ($q'^1_{k\,1}$-$q'^1_{k\,4}$). In this example set of connecting concepts, the connection depth or length is (1), and there are four connecting concepts found in the particular input document 124 where those connecting concepts are found. For each pair of similar concepts ($q'_i$, $q'_j$), self-learner 108 module may consult word embeddings 104 and co-occurrence matrices 105 to identify what other documents in input documents 124 contain connecting concepts for that pair of similar concepts. Self-learner 108 module considers each discovered connecting concept as a candidate connecting concept. That is, each candidate connecting concept will be evaluated further to determine whether it should be retained as evidence of a connection between the similar concepts.

For example, in the case of independent concept pairs "Raynaud's disease" and "fish oils", a pair of their similar concepts, "blood flow" (this is a concept deemed similar to "Raynaud's disease") and "omega-3" (this is a concept deemed similar to "fish oils") might be evaluated. Self-learner 108 module might discover, for example, that in "Document A" in input documents 124 (which may be a scholarly article), "blood flow" and "omega-3" co-occur with one another. Self-learner 108 module discovers what other medical concepts exist in Document A, which are then treated as connecting concepts. That is, each medical concept that co-occurs with similar concepts "blood flow" and "omega-3" is a concept that connects them. Note here that "blood flow" and "omega-3" are not deemed similar to each other; rather each of them is a concept that is similar to one of the two independent concepts. Assume that self-learner 108 module discovers candidate connecting concepts "human", "blood pressure", and "solubility".

Self-learner 108 module repeats this analysis, for a given pair of similar concepts, in the context of other documents where the similar concepts co-occur. Self-learner 108 module may again repeat the process discovering candidate connecting concepts at greater depths (or lengths). For example, for a pair of similar concepts ($q'_i$, $q'_j$) and a given candidate connecting concept $q'^a_{k\,n}$ (i.e., a candidate connecting concept found at depth 1 that is retained for consideration, rather than discarded after thresholding), self-learner 108 module determines additional connecting terms $q'^{a+1}_{k\,n}$ that connect all three concepts together (two similar concepts and a candidate connecting concept at a lower depth). The notation a+1 here indicates that the analysis is now at a higher depth or length.

For example, self-learner 108 module considers similar concepts "blood flow" and "omega-3", and candidate connecting concept "blood pressure". Self-learner 108 module may also consider similar concepts "blood flow" and "omega-3", and candidate connecting concept "solubility". Self-learner 108 module might remove similar concepts "blood flow" and "omega-3", and candidate connecting concept "human", from consideration, after thresholding (for example, "human" may be too generic a concept and believed to offer little contribution to the hypothesis generation process, and may be removed from consideration by a thresholding process). In this scenario, say in the example of similar concepts "blood flow" and "omega-3", and candidate connecting concept "blood pressure", self-learner 108 module identifies a set of additional connecting concepts, at "depth 2", that connect the three concepts together in a given input document 124. As described earlier, the depth can be a predetermined or configurable value.

Through successive evaluation via the above-described processes, self-learner 108 module characterizes the factors or features (or connecting concepts and their features) that bring the two independent concepts, and their similar concepts, closer together. Self-learner 108 module provides these features or "characterized factors" to model-trainer 110 module. These factors include, but are not limited to, the word-vectors of these identified connecting concepts, their changes in the temporal co-occurrence matrix, etc. Self-learner 108 module may provide these "characterized factors" to model-trainer 110 module upon each successive iteration at each depth, so that the modelling functions can be fine-tuned as a result of those iterations.

It should be noted that in some instances, self-learner 108 module might not detect any similar concepts or any sufficiently similar concepts relative to an independent concept under consideration. In this case, there may be no lists of similar concepts to evaluate. Self-learner 108 module's output would therefore have little or no valuable output to provide to model-trainer 110 module. In this case, for the given independent concept in query input 106, self-learner 108 module's output may be directly provided to hypothesis generation module 112 (described later below), rather than to model-trainer 110.

With continued reference to FIG. 1 and constituent elements of bioinformatics system 100, and in particular the general functions of model-trainer 110 module; model-trainer 110 module receives, as its input, the output of self-learner 108 module, processes that input, and generates, as its own output, a set of classifier models 118, temporal prediction models 120, and word embedding evolution models 122.

The inputs that model-trainer 110 module receives from self-learner 108 module (when such data is available) are in the form of proximity factors, i.e., the factors that bring together similar concepts $(q'_i, q'_j)$ of independent concepts $I(q_1, q_2)$. Recall that these concepts are derived from pairs of independent concepts $I(q_1, q_2)$ in query input 106, and lists $Q'_n$ of similar concepts for each of them, derived from co-occurrence matrices 105, respectively. Model-trainer 110 module may train one or more classifier models 118 based on the received proximity factors. Training a classifier model may be performed according to any known classification method in the art. Although such methods exist in the art, the choice of when to do so and what type of data to use is unique to embodiments of the invention, and is not a conventional or well understood function. The classifier uses word-vectors of the proximity factors as the input features along with optional features that are calculated from the co-occurrence matrix such as the changes in the relative co-occurrence frequencies. The absence of a representative negative set (i.e., a set of training samples which do not bring $q'_i$ and $q'_j$ together) mandates use of classifier models that belong to the class of either single-class or PU classifiers.

Model-trainer 110 module further receives, as input, temporal co-occurrence matrices 105. Using sampled data points, model-trainer 110 module fits a curve to capture the evolution of the factors over an applicable timeframe (i.e., the timeframe of the documents that establish the similarity of the two concepts, from the timestamp of the input document 124 having the first identified co-occurrence to the timestamp of the input document 124 having the last identified co-occurrence) to identify a current "relatedness curve" based on current trends. Based on the identified "relatedness curve", model-trainer 110 module generates one or more temporal prediction models 120. These temporal prediction models in their crudest form, could be as simple as a regression model that takes into consideration factors like time-sliced word-embeddings, the time it takes for the association to materialize in the training data from which the classifier model was constructed in the earlier step, etc., to predict estimated time of association formation for the given input independent queries.

Model-trainer 110 module further receives, as input, word embeddings 104. Using this input, model-trainer 110 module generates one or more word embedding evolution models 122. This process is described in greater detail in connection with FIGS. 2 and 3.

With continued reference to FIG. 1 and constituent elements of bioinformatics system 100, and in particular the general functions of hypothesis generator 112 module; this module generally receives outputs of model-trainer 110 (in the form of classifier models 118, temporal prediction models 120, and word embedding evolution models 122) if those outputs are available); and otherwise receives outputs directly from self-learner 108 module (where, for example, self-learner 108 module does not find appropriate sample data of similar concepts to add to lists $Q'_n$). Hypothesis generator 112 module processes this data, and generates a set of candidate hypotheses that it then provides to hypothesis ranker 114 module.

For example, hypothesis generator 112 module generally traverses knowledgebase 102 to find a set of paths P between the two concepts in independent concept pair $I(q_1, q_2,)$ that are specified in query input 106. For example, hypothesis generator 112 module traverses knowledgebase 102 to identify a path connecting "Raynaud's disease" to "fish oils". Where knowledgebase 102 is in graph form (for example, bipartite graph G), the traversal and tracing process likely results in multiple connecting paths; i.e., there are multiple paths of connecting edges and vertices that connect the two independent concepts. However, not all such paths are significant, and not all such paths denote a novel or noteworthy relationship. For example, some paths connecting "Raynaud's disease" to "fish oils" may be useless in generating hypotheses. For example, the two concepts may be connected via the concept "hospital" (maybe because Raynaud's disease is sometimes treated at a hospital, and because fish oils are sometimes given to patients at hospital, but the patients suffer from unrelated ailments). In this case, the fact that the two are connected by "hospital" may provide little useful insight. In other words, it might not be desirable for hypothesis generator 112 module to hypothesize that the concepts are related merely because they both appear in the context of hospitals. Were that the case, every medical concept would be deemed related to every other medical concept because every medical concept is somehow related to a hospital!

Hypothesis generator 112 module prunes the various paths P by using the various outputs of model-trainer 110 module, where they are available. Hypothesis generator 112 module applies classifier models 118 to the paths P. Those paths that meet the classifier's criteria are kept; the rest are discarded. The paths that are kept are passed to hypothesis ranker 114 module.

With continued reference to FIG. 1 and constituent elements of bioinformatics system 100, and in particular the general functions of hypothesis ranker 114 module; the module generally receives pruned paths P from hypothesis generator 112 module. Using word embeddings 104 and temporal prediction models 120, hypothesis ranker 114 module predicts, for a given path $P_n$, when (a temporal determination) the relationship will be observed in a future document (the document would be similar to input documents 124). Note that in this analysis, neither the knowledge graph G nor any input document 124 has explicitly identified a relationship between the independent concepts in query input 106 and now under consideration and connected via path $P_n$; this fact is what makes the two concepts independent. However, hypothesis ranker 114 module postulates, or hypothesizes, that a new future document, having a timestamp after that of input documents 124 that the analysis has so far considered, will be found at some point in the future. Note though, that the future timestamp is in the future only relative to input documents 124 considered so far in the analysis. The future document may in fact already exist and may in fact already be part of input documents 124; and merely not considered as of yet. In an embodiment, the sooner the expected timestamp of a given future document, relative to postulated future documents expected for other paths, the higher the given future document's ranking will be.

In an embodiment, hypothesis ranker 114 module may select the top-k concept pairs hypothesized to be connected, where "top-k" refers to the strength of their predicted connection using future documents. Using the selected concept pairs, and based on the predicted time frame for each being reflected in a future document, and further based on word embedding evolution models 122, and further based on mappings between vector spaces, hypothesis ranker 114 predicts word embeddings for the predicted time frames spaces, and re-computes changes in word embeddings of other concepts. Hypothesis ranker 114 module also updates the temporal co-occurrence matrices 105. The mapping step is needed as the word-vectors are calculated for each time slice which leads to different basis for comparison. In other words, the word-vector for the same concept across two time slices needs to be mapped to a common space for meaningful comparison. Such mappings could be done through approaches that use neighborhood information of the concept in the word-vector space. Predicting the changes in word embeddings for the future, and re-computing that of other concepts, is done through the changes made in the temporal-co-occurrence matrices.

Observe that repeating the above-described processes for each independent concept pair in query input 106 (for example, one independent concept pair per question in query input 106; there may be multiple questions), the various modules of bioinformatics system 100 yield multiple hypothesis "worlds"; one "world" for each pair of input questions. Each "world" includes the set of top-k hypotheses that suggest two otherwise independent concepts are in fact related. These sets of hypotheses (and the evidence that supports them) form outputs of hypothesis ranker 114 module, and are provided as inputs to bootstrapping 116 module.

Note that in the scenario where classifier models 118, temporal prediction models 120, word embedding evolution models 122, or a combination of them, are not generated due to a scarcity of sample data (for example, small or non-existent lists of similar concepts), hypothesis generator 112 module and hypothesis ranker 114 module may instead use global trends for each connecting term along with the similarity through word embeddings to estimate the timeframe of expected discovery of relatedness of the independent concept pairs; the sooner the estimated time frame, the higher the rank of that term to act as a connecting term. Once ranked, and based on the predicted timeframe, mappings between vector spaces, and the similarity score, the modules predict word embeddings for that timeframe, re-computer the changes in the word embeddings of other concepts, and update the co-occurrence matrices 105.

With continued reference to FIG. 1 and constituent elements of bioinformatics system 100, and in particular the general functions of bootstrapping 116 module; this module generally receives, as input, sets of top-k hypotheses (also called hypothesis "worlds") selected by hypothesis ranker 114 module, for the various independent concept pairs found in questions of query input 106. Bootstrapping 116 module processes this data, and outputs the results. The output may be provided to a user, communicated to another system or process, committed to storage, or looped back to self-learner 108 module for iterative processing; or bootstrapping 116 module may output its results to a combination of these destination points.

Bootstrapping 116 module generally processes its input as follows. For each hypothesis world, the module identifies those medical concepts that "drifted" towards each other in a substantial way during processing (by self-learner 108 module, model-trainer 110 module, hypothesis generator 112 module, and hypothesis ranker 114 module) and yet are not directly connected in knowledgebase 102 or temporal co-occurrence matrices 105. That is to say, those independent concept pairs that exhibited a significant change in relatedness, from being considered independent and unrelated, to being considered related, are identified as having drifted towards each other. Whether the drift is "significant" may be based on a predetermined or configurable threshold value. The drift for an independent concept pair may be measured as a confidence scores in the corresponding generated hypothesis that postulates the two independent concepts to in fact be related. These scores are discussed in more detail, below.

Bootstrapping 116 module reroutes each independent concept pair that drifted towards one another, after processing, back to self-learner 108 module, to hypothesis generator 112 module, and to hypothesis ranker 114 module, for iterative processing. At each iteration of generating new or updated hypothesis worlds, each world is associated with a confidence score. The confidence score is a value calculated based on the strength of the closest connecting independent concepts in that world, and further based on the world's parent worlds. A world that is created for the first time is a parent world; iterative processing of that world generates child worlds, each of which may be a parent world relative to its own children worlds. The iterative processing described above further prunes paths P and the independent concept pairs that those paths connect. Features and characteristics of the pruned paths and independent concept pairs are used to update the various models (classifier models 118, temporal prediction models 120, and word embedding evolution models 122), which then are used to generate better tuned hypotheses, better ranked hypotheses, and more reliable final hypotheses.

Where a conclusion of a given hypothesis world is corroborated by the conclusion of another hypothesis world (i.e., where more than one hypothesis world supports the postulate that a given independent concept pair are in fact related), then the corroborating hypothesis world may be merged into the given hypothesis world (the corroborating hypothesis world may be independently evaluate for merging purposes; its merger into the given hypothesis world does not destroy the corroborating hypothesis world). Based on the merger, the confidence score of the given hypothesis world, and its derivative worlds (i.e., its children worlds) can be incremented.

Figure 3:
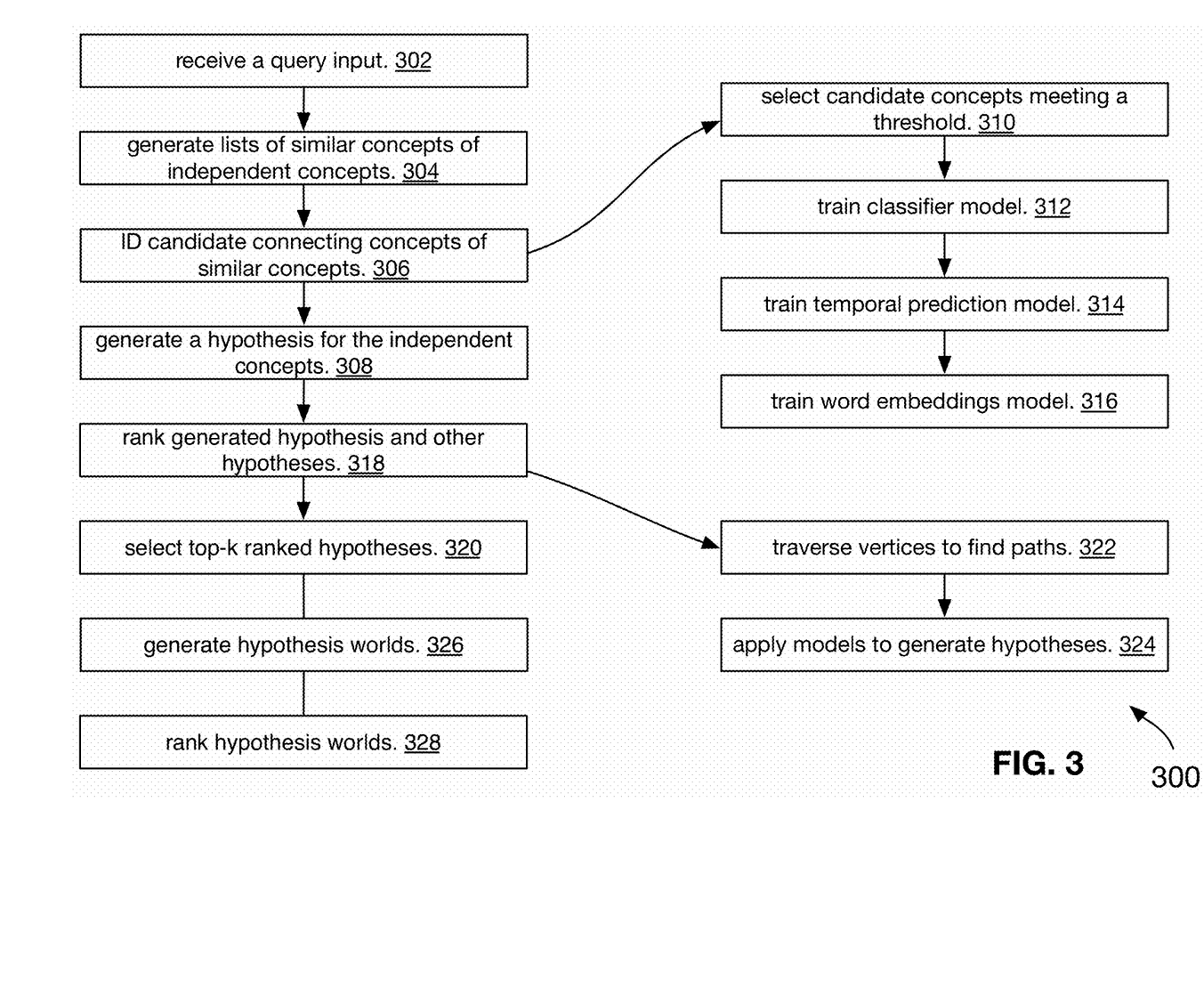
FIG. 3 is a flowchart of a method 300 for use and operation of bioinformatics system 100 of FIGS. 1 and 2, according to an embodiment of the invention.

FIGS. 2, and 3 generally illustrate aspects of bioinformatics system 100 (first described in connection with FIG. 1), including some of its components and functions, and a method 300 for the system's use. When needed for clarity, the following discussion periodically references "Example 1", which refers to the illustrative question, in query input 106, that asks "are Raynaud's disease and fish oils related?", or a question that is semantically similar to that question.

Referring now to FIGS. 2 and 3, self-learner 108 module receives (step 302) a query input 106 from a user, from an automated process, from a system, or from another source. Query input 106 may be in the form of a natural language question, or it may be in the form of a query. Each question that self-learner 108 module receives may have a pair of independent concepts (or it may have more than two independent concepts, and pairs of them may be selected for further processing). In the depicted embodiment, each question has a first independent concept and a second independent concept, the first and second independent concepts having no formally recognized relationship to one another in knowledgebase 102 of a domain of knowledge.

With respect to Example 1, self-learner 108 module receives (step 302) the question "is Raynaud's disease related to fish oils?". Bioinformatics system 100 detects (via self-learner 108 module or another module) that the question contains two entities, "Raynaud's disease" and "fish oils", and consults knowledgebase 102, which may be a medical domain knowledgebase, and determines that there is no formally recognized relationship between the two entities. For example, in a graph representation of knowledgebase 102, where "Raynaud's disease" and "fish oils" are nodes, there are no edges either directly connecting them (in the case of representation other than bipartite graph) or indirectly connecting them with hop distance of 2 (in the case of a bipartite graph). Where knowledgebase 102 includes a bipartite graph G (as described in connection with FIG. 1), for example, the two concepts may not be identified as related and would not be connected by an edge to a document indicating them to be related.

With continued reference to FIGS. 2 and 3, for each received question, and given that question's pair of independent concepts, self-learner 108 module generates (step 304) a set of lists of similar concepts for the pair of independent concepts; for example, one list per independent concept. The set of lists includes a first list of concepts deemed similar to the first independent concept, and further includes a second list of concepts deemed similar to the second independent concept. Concepts in each list are deemed similar to a corresponding independent concept using a concept-detection process.

With respect to Example 1, self-learner 108 module generates (step 304) $Q'_n$, i.e., $Q'_1$ and $Q'_2$. List $Q'_1$ contains medical concepts that are deemed sufficiently similar to "Raynaud's disease", and list $Q'_2$ contains medical concepts that are deemed sufficiently similar to "fish oils". The source of these similar concepts may be a medical concept library (including, for example, knowledgebase 102). Whether a given medical concept is sufficiently similar to "Raynaud's disease", for example, may be determined based on a distance measure of that medical concept to "Raynaud's disease" in knowledgebase 102. Other distance measures are also possible. A predetermined or dynamically set threshold value may be used to determine whether the given medical concept is sufficiently similar to "Raynaud's disease".

With continued reference to FIGS. 2 and 3, self-learner 108 module evaluates concepts of one similarity list in light of concepts of the other similarity list. This may be done by pairing two concepts, one from each list. In other words, self-learner 108 module considers similar concept pairs ($q'_i$, $q'_j$), where $q'_i$ is a similar concept selected from $Q'_1$, and where $q'_j$ is a similar concept selected from $Q'_2$. Different pairings are possible in accordance with embodiments of the invention, as described in connection with FIG. 1.

With continued reference to FIGS. 2 and 3, self-learner 108 module identifies (step 306) a set of candidate connecting concepts for at least one pair of similar concepts, i.e., a similar concept pair ($q'_i$, $q'_j$), where a first concept in the at least one pair of similar concepts is selected (as described above) from the first list of concepts and a second concept in the at least one pair of similar concepts is selected from the second list of concepts. The set of candidate connecting concepts are concepts in knowledgebase 102 that co-occur in the set of input documents 124 with the first and second concepts in the at least one pair of similar concepts.

With continued reference to FIGS. 2 and 3, according to an embodiment of the invention, self-learner 108 module's function of identifying (step 306) a set of candidate connecting concepts includes self-learner 108 module selecting (step 310) a plurality of candidate connecting concepts that meet a threshold selection value, and model-trainer 110 module training (step 312) a classifier model using features of the selected plurality of candidate connecting concepts. According to a related embodiment, model-trainer 110 module also trains (step 314) a temporal prediction model using temporal properties of the plurality of input documents 124. According to yet another related embodiment, model-trainer 110 module also trains (step 316) a word embedding evolution model using a plurality of word embeddings organized as a time series. According to related embodiments, the training functions (step 314 and step 316) may be performed using a set of co-occurrence matrices organized as a time series; i.e., temporal co-occurrence matrices 105. The training functions may also use word vectors organized as a time series; i.e., word vectors 104.

With continued reference to FIGS. 2 and 3, hypothesis generator 112 module generates (step 308) a hypothesis for the pair of independent concepts based on the identified candidate connecting concepts. The generated hypothesis represents a proposition that the first and second independent concepts are related.

With continued reference to FIGS. 2 and 3, hypothesis generator 112 module generates (step 308) one or more additional hypotheses for the pair of independent concepts based on the identified candidate connecting concepts. The one or more additional hypotheses each represent a proposition that the first and second independent concepts are related. Hypothesis ranker 114 module ranks (step 318) the generated hypothesis and the one or more additional hypotheses, relative to one another. Hypothesis ranker 114 module selects (step 320) top-k ranked hypotheses from among the ranked hypothesis and the one or more additional hypotheses.

According to an embodiment of the invention, ranking (step 318) is performed by hypothesis ranker 114 module traversing (step 322) vertices in the knowledgebase to identify a plurality of paths connecting the first independent concept to the second independent concept, and by applying (step 324) the classifier model, the temporal prediction model, and the word embedding evolution model, to the set of paths, to generate rankings of the hypothesis and the one or more additional hypotheses relative to one another.

According to an embodiment of the invention, bioinformatics system 100 may process additional pairs of independent concepts via steps 302-324, as described above (i.e., by performing one or more steps performed with respect to the first pair of independent concepts). Based on the additional processing, bootstrapping 116 module generates (step 326), for each of the pair of independent concepts and for the additional pair(s) of independent concepts, one or more hypothesis worlds. Bootstrapping 116 module ranks (step 328) hypothesis worlds according to a measure of their corresponding independent concepts drifting closer to one another.

Figure 4:
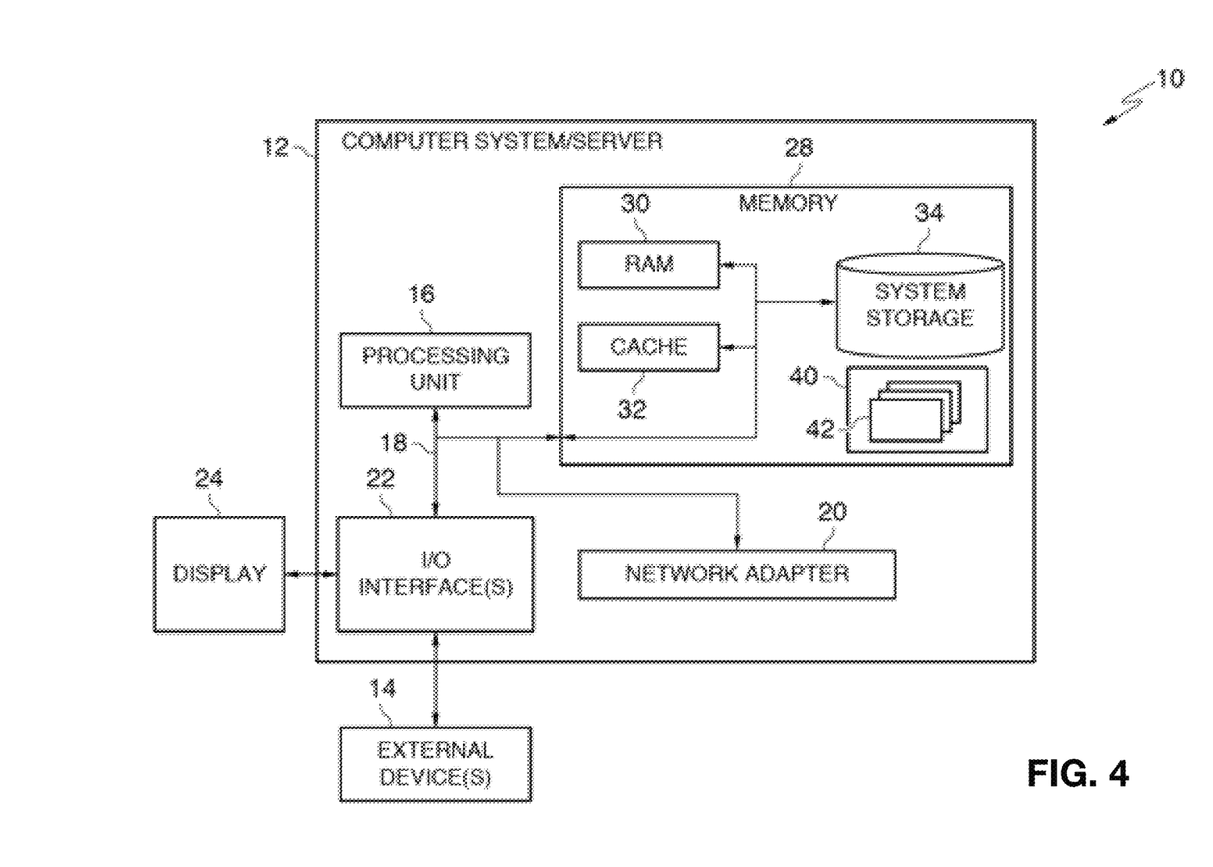
FIG. 4 is a block diagram of an illustrative computing device, according to an embodiment of the invention.

Referring now to FIG. 4, a schematic of an exemplary computing device (which may be a cloud computing node) is shown, according to an embodiment of the invention. Computing device 10 is only one example of a suitable cloud computing node and is not intended to suggest any limitation as to the scope of use or functionality of embodiments of the invention described herein. Computing device 10 is an example of one or more of the physical and virtual devices of bioinformatics system 100 (FIG. 1).

In computing device 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computing device 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now generally to embodiments of the present invention, the embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for evaluating relatedness of a pair of independent concepts by a bioinformatics system, the method comprising:
receiving a query input comprising a pair of independent concepts having no formally recognized relationship in a knowledgebase of a domain of knowledge, wherein the knowledgebase comprises an bipartite graph having a set of concepts having known interactions, and a set of electronic documents, wherein a given pair of related concepts is connected to an electronic document where the related concepts co-occur in the electronic document, and wherein concepts of the query input and concepts of the set of electronic documents are detected using a concept-detection tool performing natural language processing, the concept detection tool having a user interface to receive the query input;

identifying a plurality of candidate connecting concepts for the pair of independent concepts by analyzing a plurality of electronic documents, a plurality of co-occurrence matrices organized as a time series, and a plurality of lists of similar concepts detected using natural language processing, wherein the identifying further comprises:

selecting a plurality of candidate connecting concepts meeting a threshold selection value of a distance measure of that concept to the independent concept as reflected in the knowledgebase;

generating a plurality of hypotheses for the pair of independent concepts based on the identified candidate connecting concepts, wherein the plurality of hypotheses each represent a proposition that the first and second independent concepts are related;

ranking the plurality of hypotheses relative to one another, the ranking comprising:
  traversing vertices in the knowledgebase to identify a plurality of paths connecting the first independent concept to the second independent concept; and
  applying a classifier model trained using features of the selected plurality of candidate connecting concepts, a temporal prediction model trained using temporal properties of the plurality of input documents, and a word embedding evolution model trained using a plurality of word embeddings organized as a time series, to the plurality of paths, to generate rankings of the plurality of hypotheses;

selecting top-k ranked hypotheses from among the plurality of hypotheses; and displaying results of the selecting to a user in response to receiving the query.

2. The method of claim 1, wherein identifying a plurality of candidate connecting concepts further comprises:
  training the classifier model using the features of the selected plurality of candidate connecting concepts.

3. The method of claim 2, further comprising:
  training the temporal prediction model using the temporal properties of the plurality of input documents.

4. The method of claim 3, further comprising:
  training the word embedding evolution model using the plurality of word embeddings organized as a time series.

5. The method of claim 1, further comprising:
  processing an additional pair of independent concepts by performing one or more steps performed with respect to the pair of independent concepts;
  generating, for each of the pair of independent concepts and for the additional pair of independent concepts, one or more hypothesis worlds; and
  ranking hypothesis worlds according to a measure of their corresponding independent concepts drifting closer to one another.

6. A computer program product for evaluating relatedness of a pair of independent concepts by a bioinformatics system, the computer program product comprising a non-transitory tangible storage device having program code embodied therewith, the program code executable by a processor of a computer to perform a method, the method comprising:

receiving, by the processor, a query input comprising a pair of independent concepts having no formally recognized relationship in a knowledgebase of a domain of knowledge, wherein the knowledgebase comprises an bipartite graph having a set of concepts having known interactions, and a set of electronic documents, wherein a given pair of related concepts is connected to an electronic document where the related concepts co-occur in the electronic document, and wherein concepts of the query input and concepts of the set of electronic documents are detected using a concept-detection tool performing natural language processing, the concept detection tool having a user interface to receive the query input;

identifying, by the processor, a plurality of candidate connecting concepts for the pair of independent concepts by analyzing a plurality of electronic documents, a plurality of co-occurrence matrices organized as a time series, and a plurality of lists of similar concepts detected using natural language wherein the identifying further comprises:

selecting a plurality of candidate connecting concepts meeting a threshold selection value of a distance measure of that concept to the independent concept as reflected in the knowledgebase;

generating, by the processor, a plurality of hypotheses for the pair of independent concepts based on the identified candidate connecting concepts, wherein the plurality of hypotheses each represent a proposition that the first and second independent concepts are related;

ranking, by the processor, the plurality of hypotheses relative to one another, the ranking comprising:
  traversing, by the processor, vertices in the knowledgebase to identify a plurality of paths connecting the first independent concept to the second independent concept; and
  applying, by the processor, a classifier model trained using features of the selected plurality of candidate connecting concepts, a temporal prediction model trained using temporal properties of the plurality of input documents, and a word embedding evolution model trained using a plurality of word embeddings organized as a time series, to the plurality of paths, to generate rankings of the plurality of hypotheses;

selecting, by the processor, top-k ranked hypotheses from among the plurality of hypotheses; and displaying, by the processor, results of the selecting to a user in response to receiving the query.

7. The computer program product of claim 6, wherein identifying a plurality of candidate connecting concepts further comprises:
  training, by the processor, the classifier model using the features of the selected plurality of candidate connecting concepts.

8. The computer program product of claim 7, wherein the performed method further comprises:
  training, by the processor, the temporal prediction model using the temporal properties of the plurality of input documents.

9. The computer program product of claim 8, wherein the performed method further comprises:
  training the word embedding evolution model using the plurality of word embeddings organized as a time series.

10. The computer program product of claim 7, wherein the performed method further comprises:

processing, by the processor, an additional pair of independent concepts by performing one or more steps performed with respect to the pair of independent concepts;

generating, by the processor, for each of the pair of independent concepts and for the additional pair of independent concepts, one or more hypothesis worlds; and ranking, by the processor, hypothesis worlds according to a measure of their corresponding independent concepts drifting closer to one another.

11. A computer system for evaluating relatedness of a pair of independent concepts by a bioinformatics system, comprising:

one or more computer devices each having one or more processors and one or more tangible storage devices; and a program embodied on at least one of the one or more storage devices, the program having a plurality of program instructions for execution by the one or more processors, the program instructions comprising instructions for:

receiving a query input comprising a pair of independent concepts having no formally recognized relationship in a knowledgebase of a domain of knowledge, wherein the knowledgebase comprises an bipartite graph having a set of concepts having known interactions, and a set of electronic documents, wherein a given pair of related concepts is connected to an electronic document where the related concepts co-occur in the electronic document, and wherein concepts of the query input and concepts of the set of electronic documents are detected using a concept-detection tool performing natural language processing, the concept detection tool having a user interface to receive the query input;

identifying a plurality of candidate connecting concepts for the pair of independent concepts by analyzing a plurality of electronic documents, a plurality of co-occurrence matrices organized as a time series, and a plurality of lists of similar concepts detected using natural language processing, wherein the identifying further comprises:

selecting a plurality of candidate connecting concepts meeting a threshold selection value of a distance measure of that concept to the independent concept as reflected in the knowledgebase;

generating a plurality of hypotheses for the pair of independent concepts based on the identified candidate connecting concepts, wherein the plurality of hypotheses each represent a proposition that the first and second independent concepts are related;

ranking the plurality of hypotheses relative to one another, the ranking comprising:

traversing vertices in the knowledgebase to identify a plurality of paths connecting the first independent concept to the second independent concept; and applying a classifier model trained using features of the selected plurality of candidate connecting concepts, a temporal prediction model trained using temporal properties of the plurality of input documents, and a word embedding evolution model trained using a plurality of word embeddings organized as a time series, to the plurality of paths, to generate rankings of the plurality of hypotheses;

selecting top-k ranked hypotheses from among the plurality of hypotheses; and displaying results of the selecting to a user in response to receiving the query.

12. The computer system of claim 11, wherein identifying a plurality of candidate connecting concepts further comprises:

training the classifier model using the features of the selected plurality of candidate connecting concepts;

training, by the processor, the temporal prediction model using the temporal properties of the plurality of input documents; and training the word embedding evolution model using the plurality of word embeddings organized as a time series.

13. The computer system of claim 11, wherein the instructions further comprise instructions for:

processing an additional pair of independent concepts by performing one or more steps performed with respect to the pair of independent concepts;

generating for each of the pair of independent concepts and for the additional pair of independent concepts, one or more hypothesis worlds; and ranking hypothesis worlds according to a measure of their corresponding independent concepts drifting closer to one another.

\* \* \* \* \*